Feb. 1, 1927.
B. SCOTT
1,616,091
SHOCK ABSORBER
Filed May 3, 1926
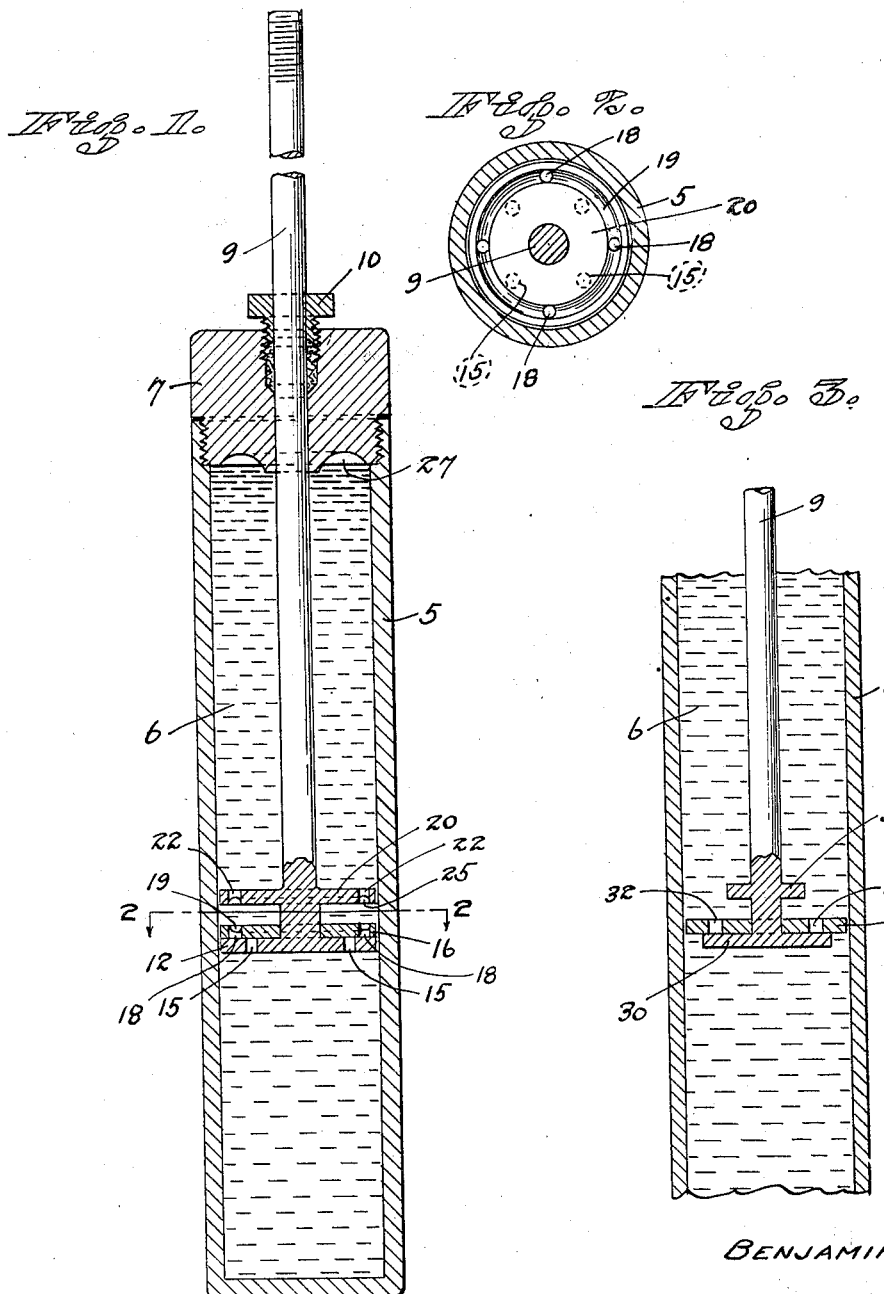
Inventor
BENJAMIN SCOTT
By
Attorneys.

Patented Feb. 1, 1927.

1,616,091

UNITED STATES PATENT OFFICE.

BENJAMIN SCOTT, OF WEST END, CALIFORNIA.

SHOCK ABSORBER.

Application filed May 3, 1926. Serial No. 106,460.

This invention relates to shock absorbers for vehicles and is especially adapted for automobiles.

An object of my invention is the provision of a simple, efficient and inexpensive shock absorber.

With the foregoing object in view, together with such other objects as may subsequently appear, this invention resides in the construction and arrangement of parts hereinafter described and claimed, and illustrated in the accompanying drawings, in which Figure 1 is a view mostly in section of one form of my device.

Figure 2 is a cross section taken on the line 2—2 of Figure 1, and

Figure 3 is a fragmentary sectional view of an alternative form of my invention.

Referring to Figure 1, the numeral 5 indicates a cylinder adapted to receive a fluid which is indicated by 6, this fluid preferably being oil which may be of any desired density. The cylinder 5 is closed at its upper end by a cap 7 herein shown as threadedly engaging the cylinder, although it is to be understood that the cap may be secured to the cylinder in any suitable manner. A rod 9 extends into the cylinder from the outside thereof through the cap 7, a stuffing box 10 being provided to prevent leakage between the rod and the cap. At the lower end of the rod 9 a valve 12 is disposed which is integral with the rod and positioned transversely thereof. This valve is provided with apertures 15, as shown in Figures 1 and 2, four of such apertures being herein shown, although it is to be understood that any desired number may be provided. Above the valve 12 is disposed a disk 16 which encircles the rod 9 and is free to slide thereon. The disk 16 is provided with apertures 18 disposed outwardly beyond the apertures 15 of the disk 12 and completely offset from the apertures 15.

An annular groove 19 is provided in the upper face of the disk 16 and has communication with the apertures 18. This groove is indicated in Figures 1 and 2. The disk 16 is shown in Figure 1 as lying on the valve 12. It will be noted from Figure 1 that above the disk 16 as there shown a disk or member 20 is provided. This disk functions as a stopping means for limiting the upward motion of the freely slidable disk 16 which moves upwardly on the downward stroke of the rod 9. The disk 20 is circular and is shown in the drawing as being integral with the rod 9 and parallel with the valve 12 and the disk 16. The limiting member 20 is provided with apertures 22 which lie in a circle of the same diameter as that on which the apertures 18 of the disk 19 lie. In the lower face of the member is provided an annular groove 25 which communicates with the apertures 22.

This groove is of the same diameter as the groove 19 in the disk 16, the groove 25 coinciding with the groove 19 when the disk 16 and the member 20 come into contact with each other, as they do on the downward stroke of the rod 9. It will be noted that the valve 12, the disk 16 and the limiting member 20 are herein shown as being of substantially the same diameter and having diameters less than the internal diameter of the cylinder in order to provide a small annular clearance between them and the inner periphery of the cylinder.

The cylinder 5 and the rod 9 may be secured to parts of the vehicle in any well known and suitable manner. When the rod 9 moves downwardly the fluid 6 below the valve 12 may pass upwardly through the apertures 15, then through the apertures 18 of the disk, since the latter is then spaced above the valve 12. The disk 16 on the downward stroke of the rod 9 will have its upper face in contact with the lower face of the member 20. The oil which flows through the apertures 18 of the disk 16 will then be free to pass through the apertures 22 of the limiting member 20. This will be true even though the apertures 18 are not directly opposite the apertures 22 of the limiting member for the fluid passing through the apertures 18 may circulate through the annular grooves 19 and 25 until it reaches the apertures 22. On the upward stroke of the rod 9, the disk 16 will come into contact with the valve 12 as shown in Figure 1, whereby the apertures 18 in the disk will be closed, the fluid 6 of the cylinder may then pass downwardly through the annular space between the inner periphery of the cylinder and the valve 12, the disk 16 and the limiting member 20. It will be noted that the lower surface of the cap 7 is provided with an annular groove 27 disposed above the level of the fluid 6. The groove 27 thus provides an air chamber which gives a cushion effect near the end of the free or down stroke of the rod 9.

Figure 3 shows fragmentarily an alternative form of my device, this form being the same as that shown in Figure 1 except for the construction of the valve, the disk and the limiting member. Figure 3 shows a rod 9 having integral therewith at its lower end a valve 30, the diameter of which is considerably less than the internal diameter of the cylinder. This valve need not have any apertures therethrough. Above the valve 30 is disposed a disk 31 provided with apertures 32 which may be closed by the valve 30. Spaced above the disk 31 as shown in Figure 3, is an annular limiting member 33 integral with the rod 9 and parallel with the valve 30 and the disk 31. The disk 31 has a diameter slightly less than the internal diameter of the cylinder while the diameter of the limiting member 33 is even less than that of the valve 30.

In the operation of this form of my device, it will be readily seen that when the rod 9 moves downwardly the limiting member 33 will come into contact with the disk 31. The apertures 32 in the disk 31 will then be open and the fluid may flow upwardly therethrough without hindrance from the limiting member 33. On the relative upstroke of the rod 9, the fluid 6 may pass below the valve through the annular space between the disk 31 and the inner periphery of the cylinder.

Although I have shown and described one embodiment of my invention, it is to be understood that the same is susceptible of various changes; and I reserve the right to employ such as may come within the scope of the appended claims.

I claim:

1. In a shock absorber, a cylinder adapted to hold a fluid, a rod reciprocable in said cylinder, an apertured disk slidable on said rod, a valve on one side of said disk secured to said rod and means for limiting the movement of said disk, the aperture referred to in said disk being beyond said rod.

2. In a shock absorber, a cylinder adapted to hold a fluid, a rod reciprocable in said cylinder, an apertured disk slidable on said rod, a valve on one side of said disk secured to said rod and means for limiting the movement of said disk, said means comprising a projection on said rod, the aperture referred to in said disk being beyond said rod.

3. In a shock absorber, a cylinder adapted to hold a fluid, a rod reciprocable in said cylinder, an apertured disk slidable on said rod, a valve on one side of said disk secured to said rod and means for limiting the movement of said disk, said valve and said disk having diameters less than the internal diameter of said cylinder, the aperture referred to in said disk being beyond said rod.

4. In a shock absorber, a cylinder adapted to hold a fluid, a rod reciprocable in said cylinder, an apertured disk slidable on said rod, a valve on one side of said disk secured to said rod and means for limiting the movement of said disk, said valve and said disk having diameters less than the internal diameter of said cylinder, said disk being slightly less in diameter and said valve being of considerably less diameter than the internal diameter of said cylinder, the aperture referred to in said disk being beyond said rod.

5. In a shock absorber, a cylinder adapted to hold a fluid, a rod reciprocable in said cylinder, an apertured disk slidable on said rod, a valve on one side of said disk secured to said rod and means for limiting the movement of said disk, said valve and said disk having diameters slightly less than the internal diameter of said cylinder, the aperture referred to in said disk being beyond said rod.

6. In a shock absorber, a cylinder adapted to hold a fluid, a rod reciprocable in said cylinder, an apertured disk slidable on said rod, a valve on one side of said disk secured to said rod and means for limiting the movement of said disk, said valve and said disk having diameters slightly less than the internal diameter of said cylinder, said disk and said valve each having an aperture therein, the aperture in said disk being fully offset from the aperture in said valve, said limiting means comprising a disk secured to said rod and having an aperture therethrough and an annular groove communicating with the aperture, said annular groove being disposed in confronting and opposite relation to a groove of the same diameter formed in the upper face of said disk, the last mentioned groove communicating with the aperture through said disk.

BENJAMIN SCOTT.